INVENTOR
ELMER MOOD

June 22, 1965   E. MOOD   3,190,325
STAKE MAKING MACHINE
Filed July 2, 1962   4 Sheets-Sheet 2

INVENTOR.
ELMER MOOD
BY
F. D. Copeland Jr.
ATTY.

INVENTOR
ELMER MOOD

INVENTOR
ELMER MOOD

United States Patent Office 3,190,325
Patented June 22, 1965

3,190,325
STAKE MAKING MACHINE
Elmer Mood, 501 N. Trinity St., Gilmer, Tex.
Filed July 2, 1962, Ser. No. 206,970
2 Claims. (Cl. 144—30)

This invention relates generally to material working apparatus and more particularly to a machine for fabricating uniform sized and shaped articles.

A primary object of this invention is to provide an improved machine for adapting a particular wood cutting operation to a rapid mass production technique that will greatly facilitate the production of uniform shaped wooden parts. Another important object of this invention is to provide an improved device for mass producing pointed surveyor's stakes of the type employed in highway construction and other uses.

A further object is to provide a machine which performs a high speed repetitive wood shearing operation in a foolproof manner.

An additional object is to provide a machine for automatically sizing individual wooden parts made in a high speed shearing operation.

A still further object is to provide a machine which, in addition to cutting and sizing wooden stakes at a fast rate, will also separate out and package a predetermined quantity of such stakes for ease of subsequent handling, storage, and general disposition of the finished products.

Another object is to provide a machine which will deliver modular packages of finished stakes in rapid production.

And yet another object of this invention is to provide a stake making, sizing and packaging machine which is precise and accurate in producing its finished product, and yet one which is economical in operation and extremely rugged and durable in its construction and function.

These and other objects and advantages will be apparent from an examination of the following specification and drawing in which.

Figure 1:
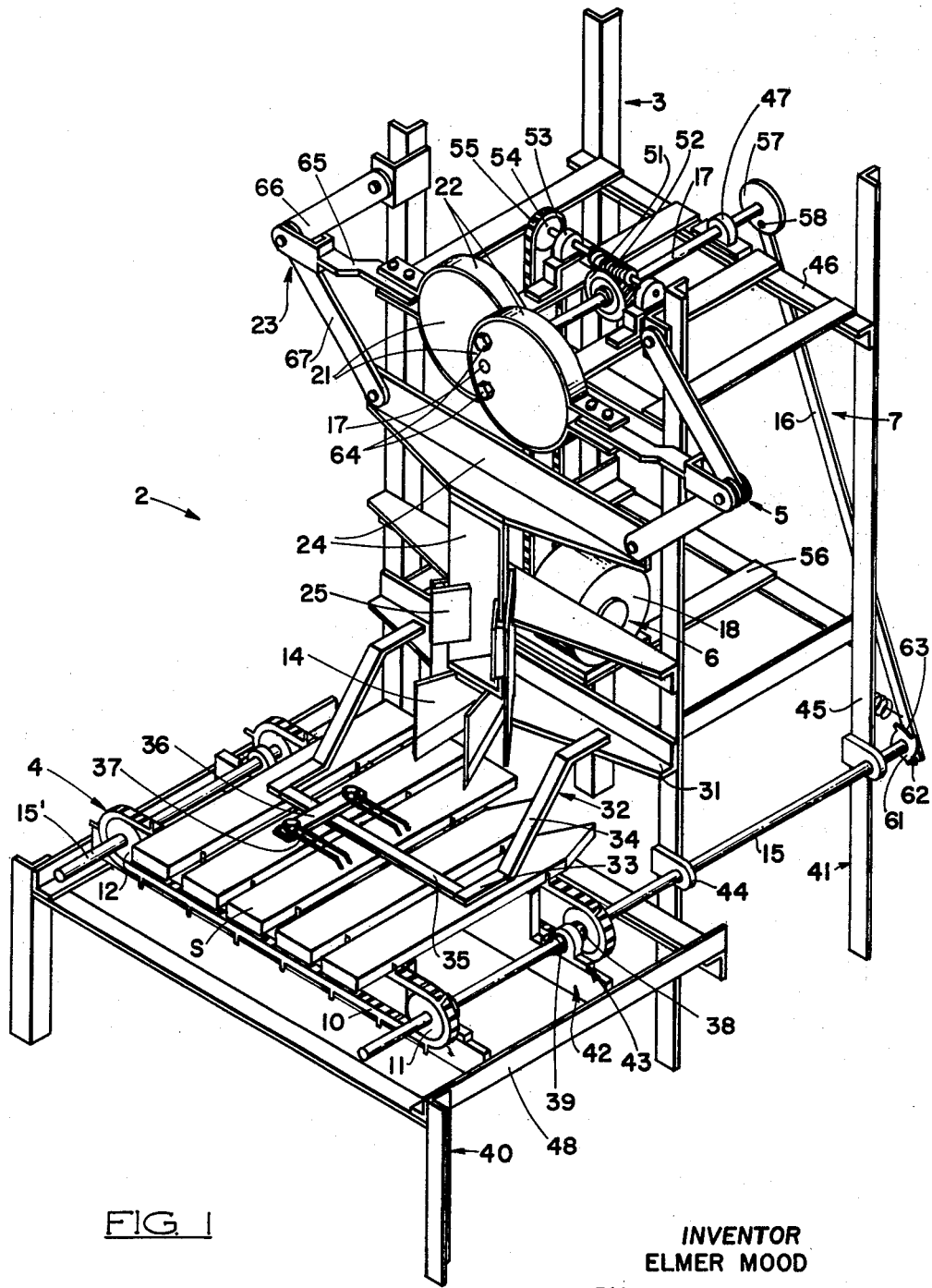
FIGURE 1 represents a perspective view of the apparatus of this invention.

Referring now more particularly to the characters of reference on the drawing, it will be observed that the stake making machine of this invention, indicated generally at 2 in FIGURE 1, is comprised generally of frame assembly 3 having a conveyor assembly 4 at its front side and having a vertically reciprocating power shearing assembly 5, including and driven by a power unit 6, supported in the main body of the frame 3, and having a control linkage assembly 7 interconnecting the shearing assembly to the conveyor assembly 4.

The conveyor assembly 4 includes a pair of spaced apart parallel continuous belts 10, which are wound over a pair of drive pulleys 11 and a pair of idler pulleys 12 in such a manner that any flat material such as stakes S lying across both belts will be moved forward past cutter blades 14 when drive shaft 15 is in motion. Shaft 15 is rotated through linkage 16 of control assembly 7 and shaft 17 by virtue of power transmitted thereto from electric motor 18 in a manner hereinafter described.

Shaft 17 also drives a pair of cooperating cam members 21 which transmit their eccentric motion through hoops 22 and linkage 23 to cutter blade support structure 24 which is guided in a vertical direction by a generally V-shaped guide rail 25.

Figure 2:
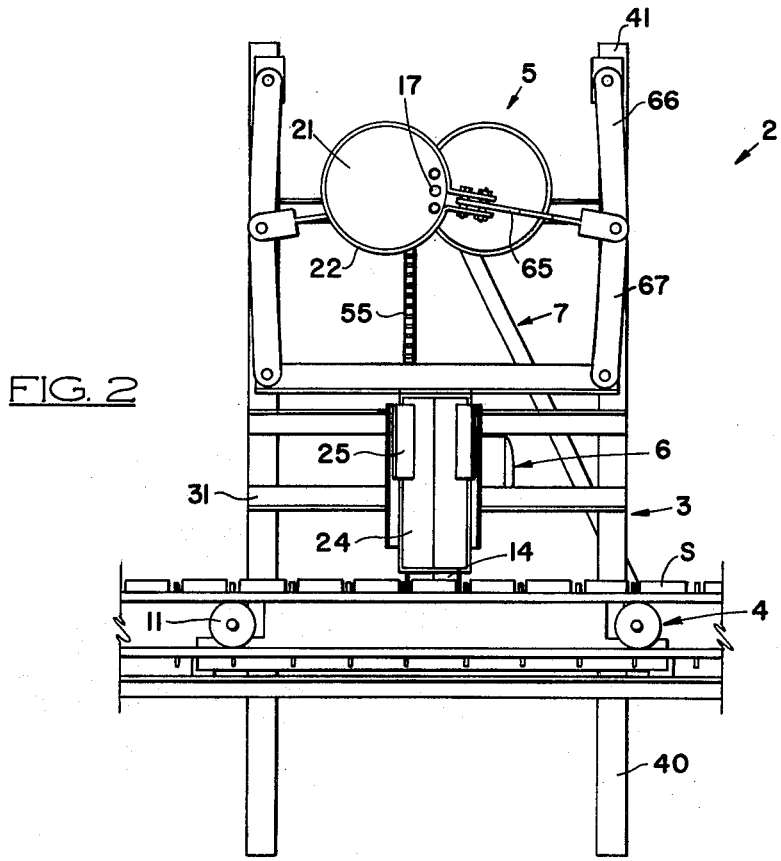
FIGURE 2 is a front elevational view of the device shown in FIGURE 1.

Directly below the V-shaped cutter blades 14 is located a flat member 30 (best seen in FIGURE 3) which includes a V-shape that corresponds with and cooperates with the V portion of cutter blades 14 in such a manner as to impart a clean shearing cut to the stakes S when they are in their position to be cut (as shown in FIGURES 1 and 2) and when the blade structure 24 is moving in the downward power stroke of its operating cycle.

Figure 3:
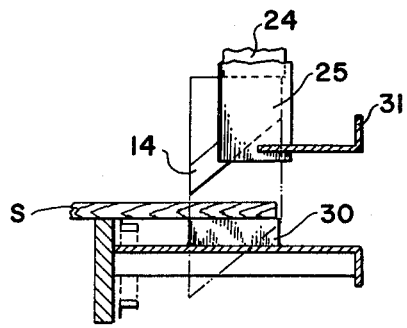
FIGURE 3 is an enlarged detail view of the shearing cutter blades and associated structure.

FIGURE 3 includes a cross member 31 at a location slightly above the surface of the stakes S when in their position shown in FIGURE 1. An auxiliary frame 32 is suspended downward and outward from the cross member 31 and is U-shaped and includes a pair of offset arms 33 connected by an intermediate member 34 in such a manner that the lower arms 33 and cross bar 35 overlie the top of stakes S. Cross bar 35 supports a short regulator arm 36 which has a pair of feelers 37 for maintaining all of the stakes S in a closely spaced relation during the operation. It should be understood that the short length conveyor belts 10 in FIGURE 1 are adapted to cooperate with a longer conveyor belt assembly at one or both ends of the belts 10 for loading and unloading operations if desired.

Conveyor assembly 4 is supported on a sub-assembly frame 40 which is smaller than the sub-assembly frame 41 with which it combines to comprise the complete frame assembly 3. Frame 40 includes a pair of parallel cross members 42 which cooperate with belts 10 to support the stakes S as they are moved past the cutter blades 14 on conveyor assembly 4. Members 42 support spaced apart pillow blocks 43 which align with each other and with bearing blocks 44 which are themselves supported by vertical legs 45 of the frame section 41. Near the top of frame 3 is located a pair of horizontal angle-iron members 46 on which are supported a pair of aligned pillow blocks 47 which rotatably support shaft 17 in such a manner as to permit it to be power rotated by virtue of the cooperation of its integral gear 51 which is rotated by worm 52, itself supported by shaft bearings 53 while being power rotated by pulley 54 as it is driven by belt 55 from a corresponding pulley on the output shaft of motor 18 supported by bars 56 at a central position in sub-assembly frame 41.

One end of the driven shaft 17 is connected to a small wheel 57 to which linkage 16 is eccentrically connected as at 58. The lower end of linkage 16 is cooperatively attached to a ratchet wheel 61 by pin 62 which is free to engage slots 63 sequentially in wheel 61 when linkage 16 is moving upward and to power drive the ratchet wheel 61 in the direction of its movement when linkage 16 is moving downward. It will thus be apparent that the belts 10 and stakes S will move only in one direction of travel and will only travel a predetermined short distance (exactly one stake width) before stopping.

The other end of driven shaft 17 is rigidly attached to cams 21 by a mounting plate (not shown) and bolts 64, so that power rotation of shaft 17 and hence cam 21 will move hoops 22 and consequently arms 65 in and out in a generally lateral direction. This movement of arms 65, due to linkage 23 will cause the individual link arms 66 and 67 to have a scissor action and move to a vertical position and in so doing to apply a quick downward push to cutter blade support structure 24. And continued rotation of shaft 17 will, after structure 24 and blades 14 have sheared one stake S and reached their lowermost position, cause arms 65 to move laterally outward and arms 66 and 67 to close toward each other so that support structure 24 is raised sufficiently to clear the stakes and permit the stakes to be moved exactly one stake width forward in conveyor 4 by virtue of the timed shifting connection through linkage 16 and control assembly 7.

The belts 10 and 55 referred to above each may be either a fabric belt or a metallic link chain with adjustable stake guiding and spacing lugs 105 but in one embodiment I use a fabric material corrugated V-belt with lugs as shown in FIG. 1 or without lugs since the outer circumference of the V-belt will frictionally move the wooden stakes. The corrugated inner circumference of this belt will positively engage a correspondingly corrugated pulley (11, 12, and 54) and will insure that the necessary cooperation between the conveyor assembly and the power shearing assembly will be obtained, and the timing will be such that a correct point will be sheared from each stake in sequence.

One of the unique features of this invention is the stacking assembly identified generally at 70, which provides for automatically stacking finished stakes to facilitate ease of handling and storage. This assembly is best seen by reference to FIG. 4, in which a guide chute 71 is supported from the frame members 40 to receive the stakes S and deposit them on elevator arms 72, for subsequent loading onto conveyor 73.

Figure 4:
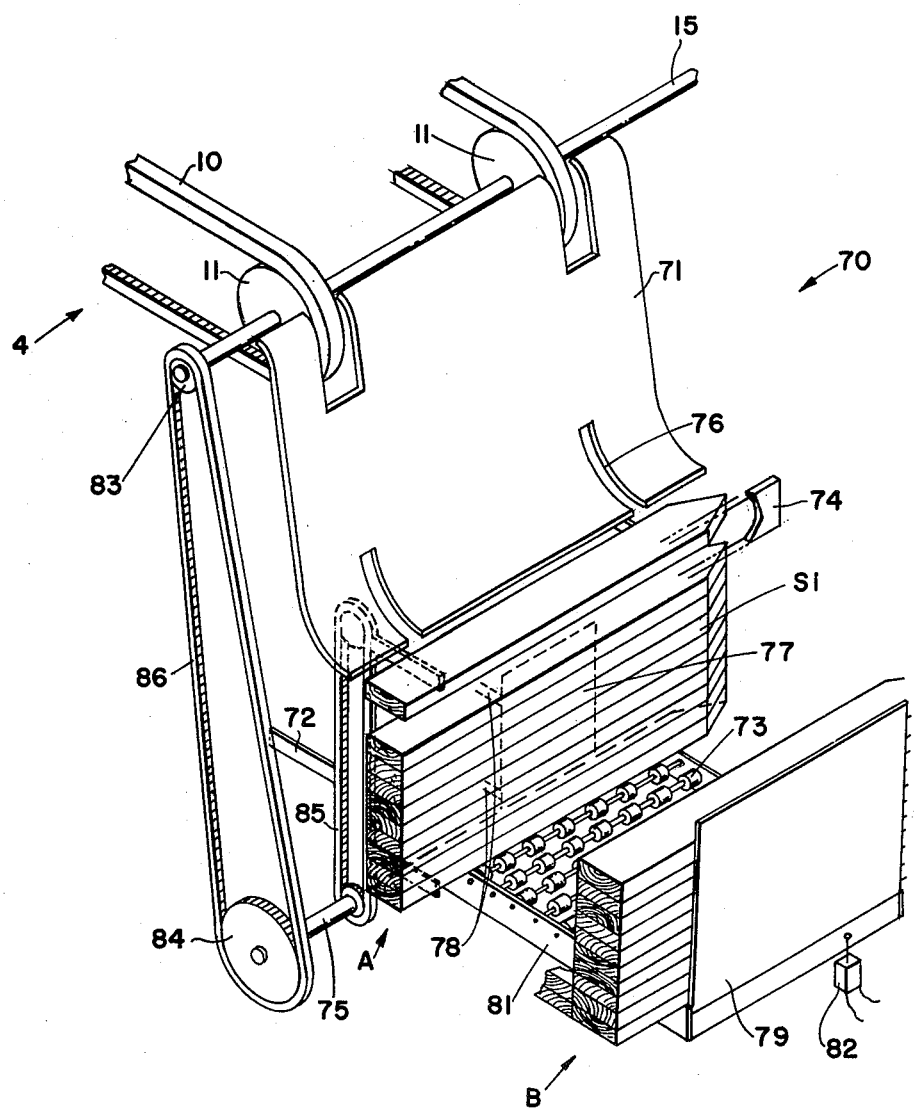
FIGURE 4 is a perspective view of one embodiment of the stacking assembly mechanism employed in this invention.

The chute 71 is generally S-shaped and is of such a configuration that stakes S coming off conveyor assembly 4, slide down the surface of chute 71 and are deposited on elevator arms 72 in a horizontal position. This chute construction prevents any tumbling of the stakes as they come off the ends of conveyor belts 10. A fixed position stop and guide bar or lug 74 prevents the stakes from overshooting their initial stacking position due to their momentum in sliding down the inclined curve. This momentum carries the first stake beyond the lower end of the chute, and onto the awaiting arms 72. After the first stake is thus deposited, the elevator arms 72 move downward slightly more than one stake thickness, with each rotation of shaft 75, so that the next and all subsequent stakes coming off the conveyor 4 will traverse the chute 71 in the same manner and will hit lug 74 and be deposited on top of the previous stake until a full stack of ten stakes (or other predetermined number) has been achieved. When a stack of ten has been completed in the position shown at A in FIG. 4, the next set of elevator arms 72 is ready to move into position by rotating thru the slots 76 at the instant the shaft 15 makes its next incremental turn. Also at this instant the lowermost stake of the ten-high stack has already engaged the lower roll-type conveyor 73 and the entire stack is moved out of position A and is carried horizontally one full stake width by the pusher 77, actuated by control linkage 78. When the initial stack, identified as S$_1$ in FIG. 4 is pushed laterally, it engages backstop 79 and carries the backstop with it for its one stake width movement. Pusher 77 is then spring returned and is so timed that it returns to its initial position before the next stake coming off chute 71 has reached a position of interference with the pusher. After the backstop 79 has been thus moved one stake width, the initial stack S$_1$ then itself acts as a backstop for the next stack of stakes and so on until the last stack has been moved to complete the desired number of stacks (five in this instance). On completion of one bundle, the machine is stopped, and this may be done automatically by means of a limit switch 82 at the position where backstop 79 will be when five (or the predetermined number) of stacks have been thus assembled. At this point the operator can loop a small rope around each end of the stakes which is protruding beyond the backstop 79 and rails 81, and the bundle can be removed from the machine for storage or shipment. When the bundle of stakes is removed, the backstop 79 is manually pushed back to its initial starting position (adjacent bar 74) and the machine is restarted (via switch 82) and the cycle is begun again. As will be seen in FIG. 4, the extension of shaft 15 beyond pulley 11 includes a smaller pulley 83 which aligns with a larger pulley 84 to obtain the desired ratio of movement between conveyor belt 10 and elevator belt 85. The movement between pulleys 83 and 84 is transmitted via corrugated belt 86.

Figure 5:
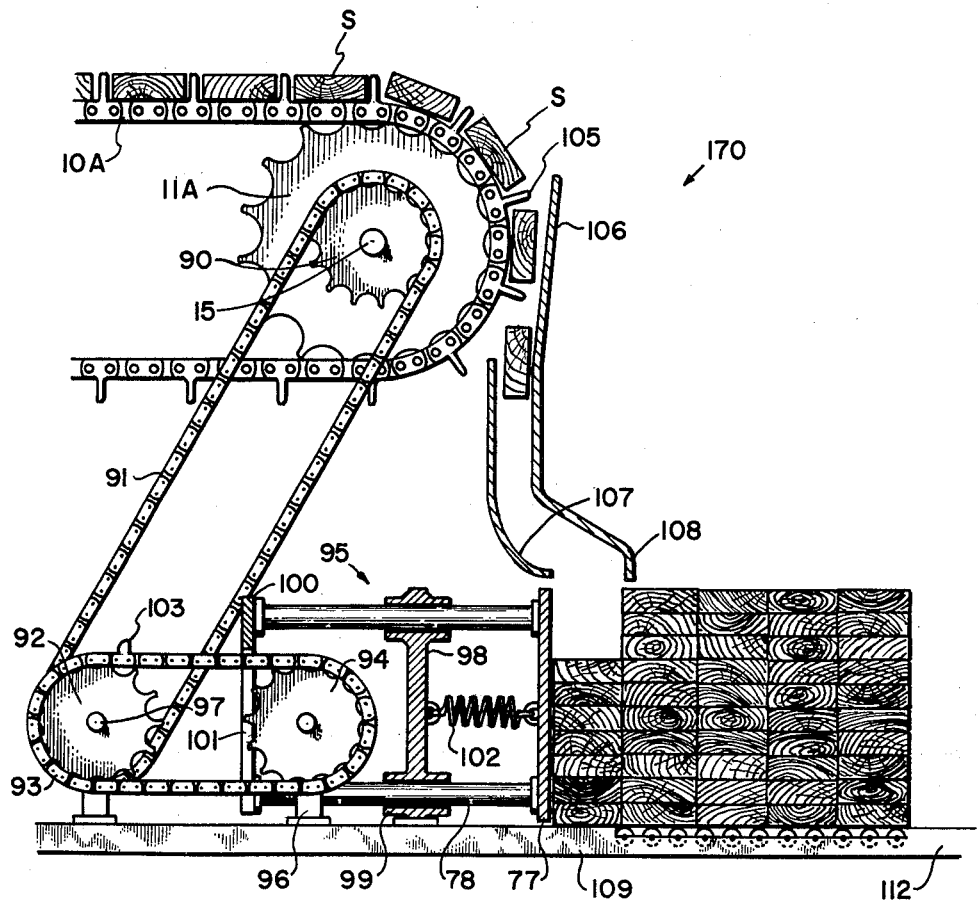
FIGURE 5 is a side elevational view of another embodiment of the stacking assembly mechanism of FIGURE 4.

Another embodiment of the stacking assembly is identified at 170 in FIG. 5. This embodiment employs the same structure and arrangement for moving a single stack of stakes as the embodiment shown at 70 in FIG. 4. This arrangement comprises a chain sprocket 90 (or corrugated belt pulley not shown) attached to shaft 15 at a location between the sprockets 11a (or pulley 11 in FIG. 4), and a chain 91 transmits motion and power to an aligned sprocket 92 which itself transmits motion and power thru chain 93 sprocket 94 located normally inside the outline of pusher structure 95. Sprockets 92 and 94 are supported by pedestals 96 containing shafts 97. Pusher structure 95 includes a pusher plate 77, four pusher arms 78, a pusher guide plate 98 having linear bearings 99, a back plate 100 having a slotted opening 101, and a tension spring 102 attached between plates 98 and 77. Chain 93 includes a pusher cam lug 103 which is adapted to engage back plate 98 and pushes this plate, arms 78 and 77 forward one stake width and in so doing extends spring 102. At the time lug 103 has moved back plate 100 a distance of one stake width, plate 100 will have moved past a vertical line thru shaft 97 of sprocket 94, and any further movement will cause lug 103 to move down and around the circumference of sprocket 94 and hence release plate 100 so that it may be returned to its initial position by spring 102.

Through the arrangement previously described, the shaft 15 will rotate a distance sufficient to move each stake S on chain 10A a lateral distance of one stake width, and when a stake reaches the location of sprocket 11A it will travel with chain 10A and around the sprocket 11A until a point is reached whereat stake S will be able to fall clear of chain lug 105. At this instant the stake will be in vertical alignment with chute 106 and the stake S will fall edgewise thru the chute until it reaches lug 107 whereat it will be turned to a horizontal position and move laterally until it strikes lug 108 which will stop its lateral motion and permit the stake to fall in a horizontal attitude until it strikes platform 109 adjacent plate 77. The next stake will follow a similar pattern and will drop into a stacked engagement with the first stake. As soon as the tenth stake has engaged the first stack, cam 103 will have begun to engage plate 100 and while the next (eleventh) stake is moving around circumference of sprocket 11A, pusher plate 77 is moving the first stack of stakes laterally one stake width. Immediately upon completion of its lateral movement pusher plate 77 will be returned, even though chain 93 and lug 103 will still be moving, and lug 105 will just be reaching the position where the eleventh stake may be dropped. As soon as 5 stacks of 10 stakes each (or the chosen quantity) has been achieved, the operator may tie the bundle as they come off the end of a long conveyor 112. In this way the machine does not have to stop between bundles and a continuous process is obtained.

The stakes S shown in FIGURE 1 represent a typical length as required by a typical state highway department. Actually the requirements vary among the several states and this machine 2 is "flexible" to meet various specifications. The pulleys 11 and 12, for example, are attached to their shafts 15 and 15' by set screws in hub 38, and set screw collars 39 attach to the shafts on the side of bearing 43 opposite to pulley 11. This construction will permit the pulleys 11 and 12 and cross members 42 to be located at any desired position by simply loosening the named set screws and sliding members 42 toward or away from each other by movement along angle iron rails 48. The handling of various widths of stakes is accomplished by the number and dimensions of notches 63 of ratchet 61 and the location of lugs 105, which are adjustable on chain 10A. Even if the exact spacing desired cannot be achieved by the location of lugs 105, the feelers 37 will permit any uniform size stake width to be utilized. If the highway department requires a very short stake with a full bevel (4″ long with 4″ bevel) this may be obtained by sawing off the bevel and running the remaining stake length thru again and again.

The cams 21 may be made slightly wider than their hoops 22, so that the mounting or spacing plate (not shown) may be omitted and cams 21 may be bolted flush together by bolts 64 while the shaft 17 is attached to both cams 21 by a conventional key.

What is claimed is:

1. An automated power machine for making and stacking articles pointed on one end, comprising in combination:
    (a) a frame assembly supporting an article conveyor assembly and a power shearing assembly,
    (b) a conveyor drive including spaced lugs in said conveyor assembly and a power shearing tool in said shearing assembly,
    (c) V-shaped cutter blades in said shearing assembly and a V-shaped member in vertical alignment with said blades and in horizontal alignment with the top of said conveyor assembly,
    (d) conveyor control means cooperating with said power shearing assembly and said conveyor assembly for applying power for moving said conveyor drive continuously in equally timed sequences a distance equal to one lug spacing whereat said lugs substantially align horizontally with said cutter blades,
    (e) means for supporting said articles over said conveyor drive and between said lugs,
    (f) stationary means to prevent upward movement of said articles during shearing operations,
    (g) said power shearing tool supported in said power shearing assembly at a location closely adjacent one lateral edge of said conveyor drive,
    (h) a single power means for applying a shearing stroke and a retraction stroke to said power tool and applying power to said conveyor drive.
    (i) and means in said control means for moving said drive following each shearing operation and during said retraction stroke in such a manner as to cause said one end of one said article to be positioned in operating relation to said tool following each conveyor drive movement,
    (j) stacking means at one end of said conveyor assembly for receiving said articles in a vertical stack,
    (k) and means operated from said single power means in said stacking means cooperating with said control means to move said vertical stack a distance of one lug spacing after a predetermnied number of articles have been stacked.

2. An automated power machine for making and stacking articles pointed on one end, comprising in combination:
    (a) a frame assembly supporting an article conveyor assembly and a power shearing assembly,
    (b) a conveyor drive including spaced lugs in said conveyor assembly and a power shearing tool in said shearing assembly,
    (c) V-shaped cutter blades in said shearing assembly and a V-shaped member in vertical alignment with said blades and in horizontal alignment with the top of said conveyor assembly,
    (d) conveyor control means cooperating with said power shearing assembly and said conveyor assembly for applying power for moving said conveyor drive continuously in equally timed sequences a distance equal to one lug spacing whereat said lugs substantially align horizontally with said cutter blades,
    (e) means for supporting said articles over said conveyor drive and between said lugs,
    (f) stationary means to prevent upward movement of said articles during shearing operations,
    (g) said power shearing tool supported in said power shearing assembly at a location closely adjacent one lateral edge of said conveyor drive,
    (h) a single power means for applying a shearing stroke and a retraction stroke to said power tool and applying power to said conveyor drive,
    (i) and means in said control means for moving said drive following each shearing operation and during said retraction stroke in such a manner as to cause said one end of one said article to be positioned in operating relation to said tool following each conveyor drive movement,
    (j) stacking means at one end of said conveyor assembly for receiving said articles in a vertical stack.
    (k) and means operated from said single power means in said stacking means cooperating with said control means to move said vertical stack a distance of one lug spacing after a predetermined number of articles have been stacked.
    (l) said means in said stacking means comprising a pusher that forms one confine for said vertical stack, while the previous vertical stack forms the other confine.

References Cited by the Examiner

UNITED STATES PATENTS

| | | | |
|---|---|---|---|
| 1,325,185 | 12/19 | Bailey et al. | |
| 1,736,143 | 11/29 | Townsend | 83—282 |
| 1,920,999 | 8/33 | Murch. | |
| 2,032,581 | 3/36 | Lane. | |
| 2,424,093 | 7/47 | Harred. | |
| 2,470,959 | 5/49 | Swenson | 144—30 |
| 2,497,149 | 2/50 | Berdis et al. | |
| 2,606,669 | 8/52 | Morrison. | |
| 2,693,885 | 11/54 | Junco. | |
| 2,934,221 | 4/60 | Tonna. | |

LESTER M. SWINGLE, *Primary Examiner.*

EARL EMSHWILLER, WILLIAM W. DYER, Jr.,
*Examiners.*